July 7, 1931.  F. R. PETERS  1,813,421

LOCOMOTIVE BOOSTER ENTRAINING AND IDLING MECHANISM

Filed Jan. 28, 1930  2 Sheets-Sheet 1

INVENTOR
Frank R. Peters
BY
ATTORNEYS

Patented July 7, 1931

1,813,421

UNITED STATES PATENT OFFICE

FRANK RICHARD PETERS, OF NEW YORK, N. Y., ASSIGNOR TO FRANKLIN RAILWAY SUPPLY COMPANY, OF NEW YORK, N. Y., A CORPORATION OF DELAWARE

LOCOMOTIVE BOOSTER ENTRAINING AND IDLING MECHANISM

Application filed January 28, 1930. Serial No. 424,092.

The present invention relates to locomotive booster motors and particularly to that type of motor which has now become quite common in the art wherein a shiftable idler gear is employed between a driving pinion and a gear on the axle for the purpose of entraining and disentraining the motor.

The principal object of the invention is to provide means for more simply causing entrainment of the booster, while, at the same time, providing for the idling operation which is so important from the standpoint of operating reliability.

More specifically stated, it is an object of my invention to eliminate the customary entraining motor and to substitute in place thereof a mechanism for effecting the requisite movement of the shiftable idler gear simply upon rotation of the booster driving pinion, together with means whereby an idling operation of the booster is made possible without at the same time causing entrainment.

A further object of the invention is to provide a steam actuated means for preventing entrainment when an idling operation is desired together with means for thereafter using the steam from said means to idle the booster.

A still further object of the invention is to provide a means which is effective when entrainment takes place to release the restraint normally placed upon the free rotation of the idler gear, said means being adapted to cooperate with the means for preventing entrainment when the booster is to be idled.

Figure 1:
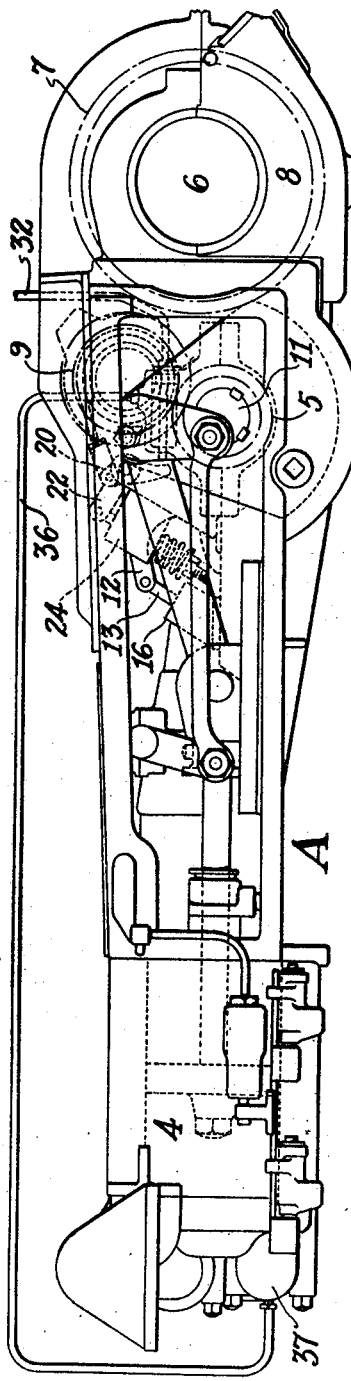

The accompanying drawings illustrate a preferred embodiment of the invention, Fig. 1 being a side elevation of a booster motor embodying my improvements.

Figure 2:
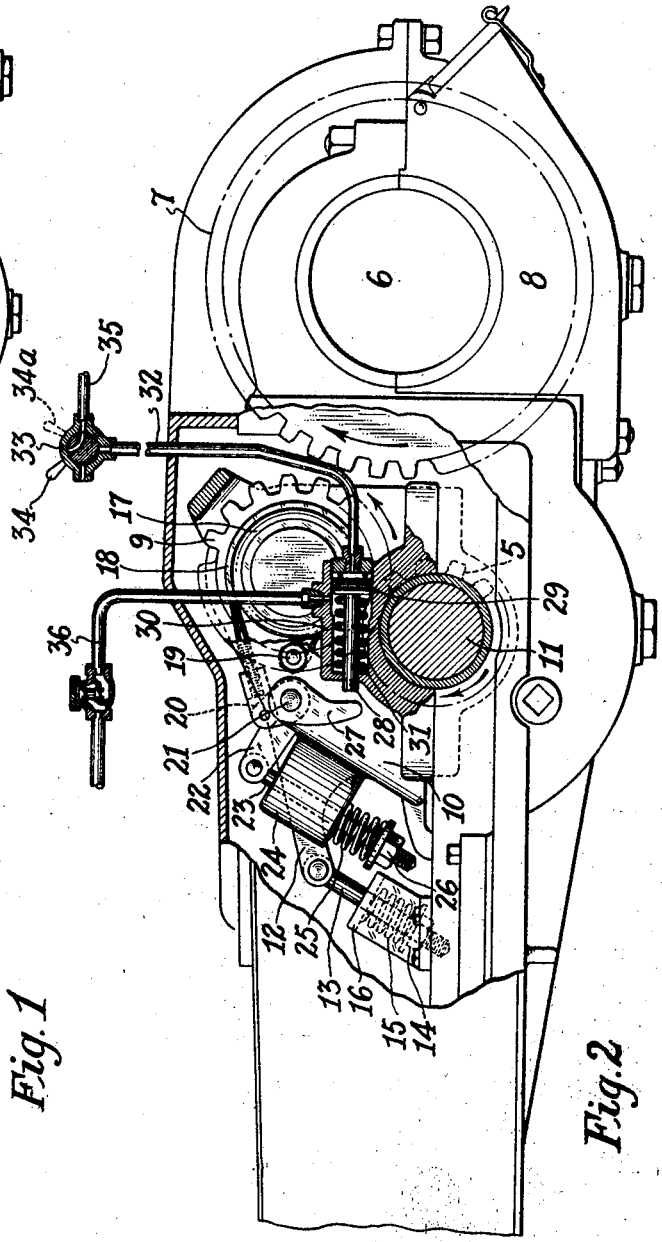
Figure 3:
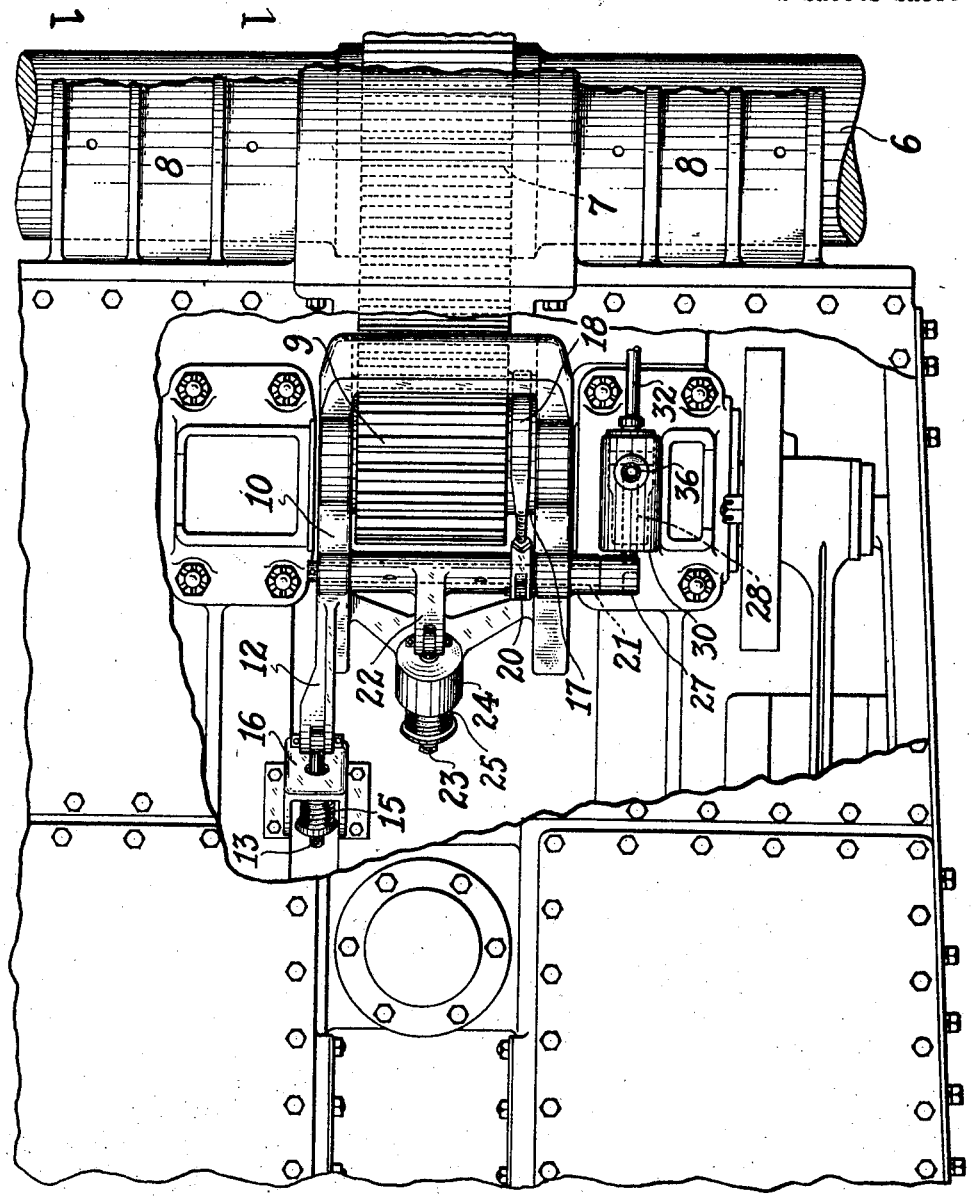

Fig. 2 being a longitudinal section on an enlarged scale through a portion of the booster for the purpose of illustrating my invention more in detail, and Fig. 3 being a plan view of a portion of the booster of Figs. 1 and 2, with the cover plate partly broken away to still further illustrate the details of my invention.

The drawings illustrate the usual booster motor A having a pair of cylinders 4 at the rear end suitably arranged to rotate the driving pinion 5 at the forward end in a manner not necessary to describe in detail since it forms no part of the present invention.

The axle 6 to be driven is provided with the axle gear 7 which is located intermediate the forward axle embracing portions 8 of the customary booster bed plate.

Between the driving pinion 5 and the driven gear 7 is disposed the idler gear 9 which, as shown, is constantly in mesh with the driving pinion 5. The idler 9 is suitably mounted upon a rocking member 10 which is arranged to swing upon the booster crank shaft 11 as a fulcrum. When the gear 9 is moved to the right it will mesh with the gear 7 on the axle 6 and the booster will then be entrained and ready to aid in propelling the locomotive.

The rocking member 10 is provided with a rearward extension 12 to which is pivotally secured a bolt 13 provided with an adjustable nut 14 by means of which the tension on the spring 15 can be regulated, the spring being adapted to cooperate with the housing 16 so as to normally exert a pressure tending to hold the idler gear 9 out of mesh with the axle gear 7.

Normally the idler 9 is restrained from free rotation by means of the following construction. At one end the idler 9 is provided with an extension or hub 17 which serves as a brake drum for the band brake 18, one end of the brake band being secured to the movable member 10 at the point 19 and the other end being secured to the arm 20 of a bell crank lever which is pivoted to the shiftable member 10 upon the fulcrum pin 21.

The bell crank has another arm 22 which carries the bolt 23 at its end, the bolt extending down through the rearwardly extending bracket 24 on the shiftable member 10. A spring 25 surrounds the bolt 23 and reacts between the bracket 24 and an adjustable nut 26 on the end of the bolt. By adjusting the tension on the spring 25 it is possible to vary the power applied by the brake band 18 to the drum 17 of the idler gear 9 so as to increase or decrease at will the resistance which it offers to free rotation of the idler gear 9.

Since the driving pinion 5 is rotated by the booster motor in the direction of the arrow, it will be seen that while the brake 18 is applied the first effect of rotation of the driving pinion 5 will be to move the idler gear 9 toward the right in order to mesh it with the axle gear 7. As soon as the teeth on the gears 9 and 7 begin to exert a driving power, the tendency is for the gear 9 to be drawn down with considerable force into complete and firm contact with the gear 7 at which time, of course, it is desirable that the tension on the brake 18 be released. This is accomplished in the following way.

A third downwardly extending arm 27 on the bell crank is brought into engagement with the piston rod 28 which extends rearwardly from the operating piston 29. The piston 29 being at the right hand end of its stroke as shown in Fig. 2, the lever 27 will be forced to the left and the lever 20 to the right so as to relieve the pressure exerted by the band 18. Just as soon as the booster is disentrained the lever 27 will be moved out of engagement with the piston rod 28 and the brake band 18 will once more apply its power to the drum 17 and the parts will assume the position indicated in Fig. 2.

In order to permit idling of the booster and to warm it up prior to the time that it is thrown into operation as a driving factor, I provide the following mechanism. The piston 29 is arranged to reciprocate within the cylinder 30, the piston being held normally in its right hand position by means of a spring 31. In order to idle the booster without causing entrainment, it will be necessary, of course, to release the power applied by the brake 18. I accomplish this by arranging to supply steam pressure to the right-hand end of the piston 29 through the conduit 32 which is under the control of the idling valve 33, the handle 34 of which being within convenient reach of the locomotive engineer. With the handle 34 in the full line position, the supply of steam coming in through the pipe 35 cannot reach the pipe 32, but when the valve handle 34 is moved to the dotted line position 34a, the pipe 35 is connected to the pipe 32 and steam pressure will flow to the piston 29 and move it to the left so as to bring the piston rod 28 into engagement with the arm 27 of the bell crank, such action effecting the release of the brake band 18 in the manner already described.

It will therefore be seen that I have provided a mechanism for preventing entrainment when an idling operation is desired which is arranged to cooperate with and be subject to the action of the shiftable entraining member 10 to release the pressure of the band 18 at such times as the booster is intended to function as a driving factor. In this way I accomplish these two aims of my invention with the fewest possible number of parts and in a very simple manner.

In order to be sure that the booster will not receive steam during an idling operation prior to the time that the power of the brake is released, I arrange to take the steam for the idling operation directly from the cylinder 30 after the piston 29 has been moved to the release position. The piston 29 uncovers a port which is connected to the pipe 36 and the pipe 36 is extended and connected to the inlet manifold 37 which supplies the steam to the booster cylinders.

What I claim is:—

1. An entraining mechanism for boosters characterized by the fact that a shiftable gear is provided the rotation of which is normally restrained and further by the fact that steam actuated means is provided for removing said restraint the exhaust steam from which is used to idle the booster.

2. In booster entraining mechanism the combination of an idler gear, means normally restraining rotation thereof, steam actuated means for removing said restraint, and means for thereafter using the steam to idle the booster.

3. In a booster the combination of a driving pinion, an axle gear, an idler gear in mesh with said pinion and adapted to be moved into mesh with the axle gear to entrain the booster, a brake normally restraining rotation of said idler so that the idler will be moved into mesh with the axle gear upon rotation of said pinion, a steam actuated piston, means moving with the idler adapted to abut against said piston to release said brake when the booster is in operation, and means for supplying steam to move said piston to cause release of the brake so that the booster may be idled.

4. In a booster the combination of a driving pinion, an axle gear, an idler gear in mesh with said pinion and adapted to be moved into mesh with the axle gear to entrain the booster, a brake normally restraining rotation of said idler so that the idler will be moved into mesh with the axle gear upon rotation of said pinion, a steam actuated piston, means moving with the idler adapted to abut against said piston to release said brake when the booster is in operation, and means for supplying steam to move said piston to cause release of the brake so that the booster may be idled together with means for thereafter using said steam to idle the booster.

5. In a booster the combination of an idler gear, a brake, spring means normally applying said brake, a piston for overcoming said spring and releasing the brake, and means for supplying steam to move said piston.

6. In a booster the combination of an idler gear, a brake, spring means normally applying said brake, a piston for overcoming said spring and releasing the brake, and means for supplying steam to move said piston, together with means for thereafter using the steam to idle the booster.

7. The combination of a normally disentrained booster, an idler gear shiftably mounted so as to be moved to entrain the booster, a brake, means normally effective to apply said brake to restrain rotation of the idler gear, a piston, means shiftable with the idler adapted to contact with the piston to release said brake when the booster is entrained, and means for supplying fluid pressure to move said piston to cause release of said brake so that the booster may be idled.

8. The combination of a normally disentrained booster, an idler gear shiftably mounted so as to be moved to entrain the booster, a brake, means normally effective to apply said brake to restrain rotation of the idler gear, a piston, means shiftable with the idler adapted to contact with the piston to release said brake when the booster is entrained, and means for supplying steam to move said piston to cause release of said brake together with means for thereafter using said steam to idle the booster.

9. In a locomotive booster the combination of a gear to be driven, a driving pinion, an idler gear in mesh with the pinion movably mounted for entrainment with and disentrainment from said gear to be driven, means normally restraining rotation of said idler, the idler normally being moved into mesh with the gear to be driven upon rotation of said pinion, leverage means for overcoming said restraint, and fluid pressure actuated means for moving said leverage means to permit rotation of the pinion and of the idler without effecting meshing of the idler with the gear to be driven, said leverage means being adapted to be brought into contact with said fluid pressure actuated means to overcome said restraint when said idler is entrained with said gear to be driven during operation of the booster.

10. In a locomotive booster the combination of a gear to be driven, a driving pinion, an idler gear in mesh with the pinion movably mounted for entrainment with and disentrainment from said gear to be driven, a brake normally restraining rotation of said idler, a steam actuated piston for releasing said brake, and means for using the steam to idle the booster after said brake is released.

11. In a booster, the combination of an idler gear, a brake normally effective to restrain rotation of said idler gear, and fluid actuated means for releasing said brake so that the booster may be idled.

12. The combination of a normally disentrained booster, an idler gear shiftably mounted so as to be moved to entrain the booster, a brake normally effective to restrain rotation of the idler gear, means adapted to release said brake when the idler gear is shifted to entrain the booster and means for releasing said brake to permit idling of the booster prior to entrainment.

In testimony whereof I have hereunto signed my name.

FRANK R. PETERS.